US008610700B2

(12) United States Patent
Choi

(10) Patent No.: US 8,610,700 B2

(45) Date of Patent: Dec. 17, 2013

(54) ORGANIC LIGHT EMITTING DISPLAY

(75) Inventor: Sang-Moo Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 884 days.

(21) Appl. No.: 12/710,219

(22) Filed: Feb. 22, 2010

(65) Prior Publication Data

US 2010/0220091 A1 Sep. 2, 2010

(30) Foreign Application Priority Data

Mar. 2, 2009 (KR) ........................ 10-2009-0017541

(51) Int. Cl.
*G06F 3/038* (2013.01)

(52) U.S. Cl.
USPC ............... 345/211; 345/82; 345/204; 345/77; 315/169.3

(58) Field of Classification Search
USPC ........... 345/204, 211, 213, 88, 76–77, 82–83, 345/690; 315/169.3
See application file for complete search history.

(56) References Cited

U.S. PATENT DOCUMENTS

2006/0097965 A1* 5/2006 Deane et al. .................... 345/76
2006/0103611 A1* 5/2006 Choi ............................... 345/82
2006/0267509 A1* 11/2006 Yang .......................... 315/169.3
2007/0063933 A1* 3/2007 Chung ............................ 345/76
2007/0236430 A1* 10/2007 Fish ............................... 345/82

FOREIGN PATENT DOCUMENTS

KR 10-2006-0115203 11/2006
KR 1020070112714 A 11/2007
KR 1020070118857 A 12/2007
KR 10-2008-0056923 6/2008
KR 10-2008-0077528 8/2008

OTHER PUBLICATIONS

KIPO Office Action dated Jul. 18, 2011 for Korean priority patent application 10-009-0017541, 1 page.

* cited by examiner

*Primary Examiner* — Lun-Yi Lao
*Assistant Examiner* — Shaheda Abdin
(74) *Attorney, Agent, or Firm* — Christie, Parker & Hale, LLP

(57) ABSTRACT

An organic light emitting display includes a pixel circuit that compensates for variations of the threshold voltage of a driving transistor. The organic light emitting display includes a scan driver, a data driver, a power source unit, and a plurality of pixels. If a pixel is assumed to be positioned in an ith (i is a natural number) horizontal line, that pixel includes an organic light emitting diode (OLED), a first transistor coupled between a power source line and the OLED, a second transistor having a gate electrode coupled to an ith scan line for supplying the data signal to the first transistor, a third transistor coupled between the OLED and the first transistor and having a gate electrode coupled to an ith emission control line, and a storage capacitor coupled between the gate electrode of the first transistor and an anode electrode of the OLED.

12 Claims, 5 Drawing Sheets

ORGANIC LIGHT EMITTING DISPLAY

CROSS-REFERENCE TO RELATED APPLICATION

This application claims priority to and the benefit of Korean Patent Application No. 10-2009-0017541, filed on Mar. 2, 2009, in the Korean Intellectual Property Office, the entire content of which is incorporated herein by reference.

BACKGROUND

1. Field of the Invention

The present invention relates to an organic light emitting display, and more particularly, to a driving circuit for a pixel in an organic light emitting display.

2. Description of the Related Art

Recently, various flat panel displays (FPDs) having less weight and volume than cathode ray tubes (CRTs) have been developed. FPDs include liquid crystal displays (LCDs), field emission displays (FEDs), plasma display panels (PDPs), and organic light emitting displays.

Among the FPDs, the organic light emitting displays display images using organic light emitting diodes (OLEDs) that generate light by a re-combination of electrons and holes. The organic light emitting display has a relatively high response speed and is driven with a relatively low power consumption.

FIG. 1 is a circuit diagram illustrating a pixel of a conventional organic light emitting display. In FIG. 1, the transistors included in pixels are NMOS transistors.

Referring to FIG. 1, a pixel 4 of the conventional organic light emitting display includes an organic light emitting diode OLED and a pixel circuit 2 coupled to a data line Dm and a scan line Sn to control the OLED.

The anode electrode of the OLED is coupled to the pixel circuit 2 and the cathode electrode of the OLED is coupled to a second power source ELVSS. The OLED generates light having a brightness (e.g., light having a predetermined brightness) that corresponds to current supplied from the pixel circuit 2.

The pixel circuit 2 controls the amount of current supplied to the OLED to correspond to a data signal supplied through the data line Dm when a scan signal is supplied through the scan line Sn. Therefore, the pixel circuit 2 includes a second transistor M2 (that is, a driving transistor) coupled between a first power source ELVDD and the OLED, a first transistor M1 coupled between the second transistor M2, the data line Dm, and the scan line Sn, and a storage capacitor Cst coupled between the gate electrode and the second electrode of the second transistor M2.

The gate electrode of the first transistor M1 is coupled to the scan line Sn and the first electrode of the first transistor M1 is coupled to the data line Dm. The second electrode of the first transistor M1 is coupled to one terminal of the storage capacitor Cst. Here, the first electrode is either a source electrode or a drain electrode and the second electrode is the other electrode thereof different from the first electrode. For example, when the first electrode is the source electrode, the second electrode is the drain electrode. The first transistor M1 coupled to the scan line Sn and the data line Dm is turned on when a scan signal is supplied from the scan line Sn, and thereby supplies a data signal supplied from the data line Dm to the storage capacitor Cst. At this time, the storage capacitor Cst charges a voltage corresponding to the data signal.

The gate electrode of the second transistor M2 is coupled to one terminal of the storage capacitor Cst and the first electrode of the second transistor M2 is coupled to the first power source ELVDD. The second electrode of the second transistor M2 is coupled to the other terminal of the storage capacitor Cst and the anode electrode of the OLED. The second transistor M2 controls the amount of current supplied from the first power source ELVDD to the second power source ELVSS through the OLED to correspond to the voltage value stored in the storage capacitor Cst.

One terminal of the storage capacitor Cst is coupled to the gate electrode of the second transistor M2 and the other terminal of the storage capacitor Cst is coupled to the anode electrode of the OLED. The storage capacitor Cst charges the voltage corresponding to the data signal.

The conventional pixel 4 supplies the current corresponding to the voltage charged in the storage capacitor Cst to the OLED to display an image with a brightness corresponding to the current (e.g., a predetermined brightness). However, the above-described conventional organic light emitting display cannot display an image with uniform brightness due to a deviation in the threshold voltages of the second transistors M2 in multiple pixels 4.

That is, when the threshold voltage of the second transistor M2 varies with each of the pixels 4, since the pixels 4 generate light components with different brightness corresponding to the same data signal, an image with uniform brightness cannot be displayed.

SUMMARY

Accordingly, one aspect of the present invention provides an organic light emitting display that compensates for variations in the threshold voltages of driving transistors.

According to an exemplary embodiment of the present invention, an organic light emitting display includes a scan driver, a data driver, a power source unit, and a plurality of pixels. The scan driver sequentially supplies a scan signal to a plurality of scan lines and sequentially supplies an emission control signal to a plurality of emission control lines. The data driver supplies a data signal to a plurality of data lines in synchronization with the scan signal. The power source unit supplies a first power source to a plurality of power source lines. The pixels are positioned at respective crossing regions of the scan lines, the emission control lines, and the data lines. Each of the pixels positioned in an ith (i is a natural number) horizontal line of a plurality of horizontal lines comprises an organic light emitting diode (OLED), first, second, and third transistors, and a storage capacitor. The first transistor is coupled between a corresponding power source line of the power source lines and the OLED to control an amount of current supplied to the OLED. The second transistor has a gate electrode coupled to an ith scan line of the scan lines to be turned on when the scan signal is supplied to the ith scan line to supply the data signal to the gate electrode of the first transistor. The third transistor is coupled between the OLED and the first transistor, and has a gate electrode coupled to an ith emission control line of the emission control lines. The storage capacitor is coupled between the gate electrode of the first transistor and an anode electrode of the OLED. The plurality of pixels may include NMOS transistors.

In some embodiments, the scan driver supplies the emission control signal to the ith emission control line at least partially to coincide with the scan signal supplied to an (i−1)th scan line and the ith scan line. The emission control signal may comprise a pulse having a third voltage, so that the third transistor is in a weak turn-on state. When the emission control line has a fourth voltage higher than the third voltage, the third transistor is turned on. The power source lines may be substantially parallel with the scan lines on each of the horizontal lines. The power source unit supplies a first power source having a first voltage to an ith power source line of the power source lines at least partially to coincide with the scan signal supplied to the (i−1)th scan line and supplies a first power source having a second voltage higher than the first voltage to remaining power source lines of the power source lines. The first voltage supplied to the first power source line may be adapted to turn off the OLED. The organic light emitting display may further include a fourth transistor coupled between the corresponding power source line of the power source lines and the third transistor, the fourth transistor being adapted to be turned on when the scan signal is supplied to the ith scan line. The organic light emitting display may further include a fourth transistor coupled between the anode electrode of the OLED and an initialization power source, the fourth transistor being adapted to be turned on when the scan signal is supplied to the (i−1)th scan line. The initialization power source may be configured to supply an initialization signal having a voltage adapted to turn off the OLED. The power source unit may further be configured to supply a predetermined voltage to the power source lines so that current can be supplied to the OLED.

According to various embodiments of the organic light emitting display of the present invention, an image with a substantially uniform brightness can be displayed regardless of variations in the threshold voltages of the driving transistors.

BRIEF DESCRIPTION OF THE DRAWINGS

The accompanying drawings, together with the specification, illustrate exemplary embodiments of the present invention, and, together with the description, serve to explain the principles of embodiments of the present invention.

DETAILED DESCRIPTION OF EXEMPLARY EMBODIMENTS

Figure 1:
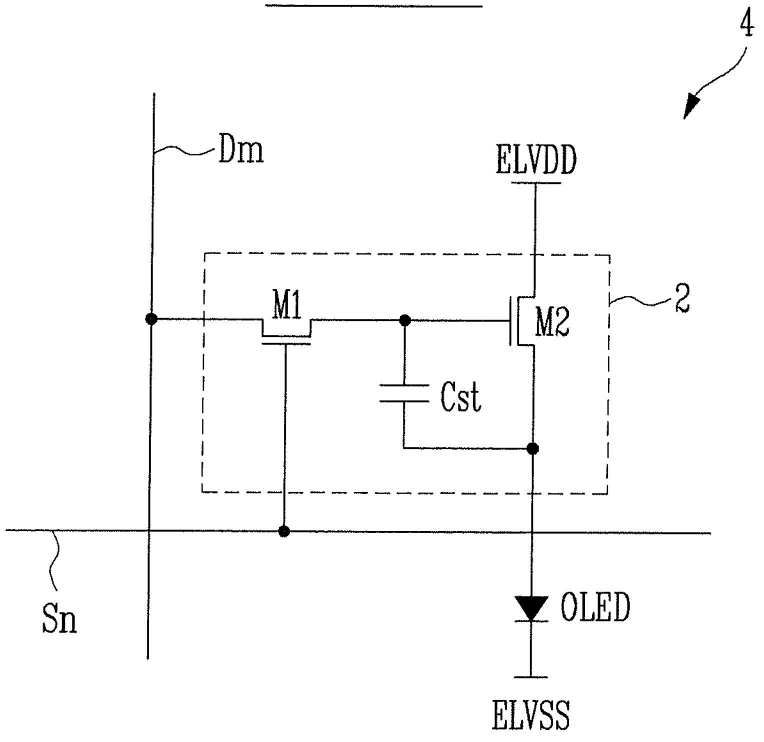
FIG. 1 PRIOR ART
FIG. 1 is a circuit diagram illustrating a pixel of a conventional organic light emitting display.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Hereinafter, the exemplary embodiments by which those skilled in the art can easily perform the present invention will be described in detail with reference to the accompanying drawings, that is, FIGS. 2 to 6.

Figure 2:
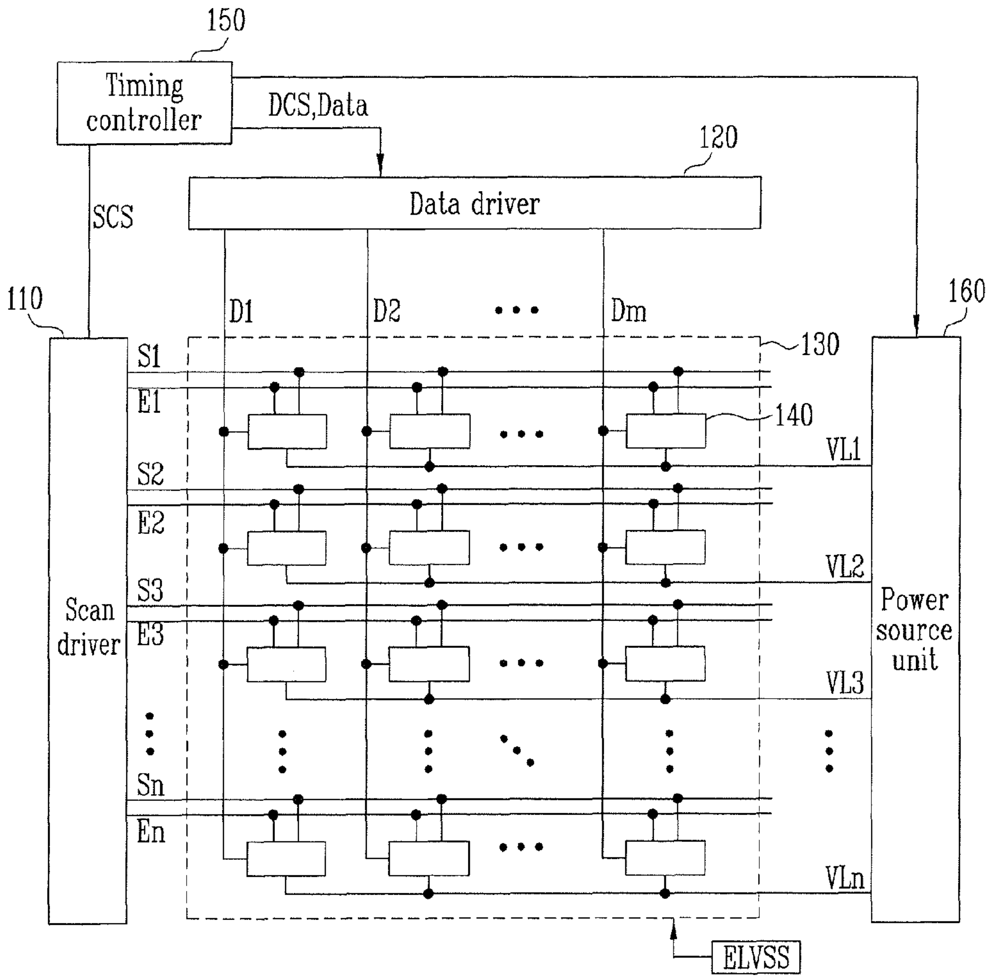
FIG. 2 illustrates an organic light emitting display according to an exemplary embodiment of the present invention.

FIG. 2 illustrates an organic light emitting display according to an exemplary embodiment of the present invention.

Referring to FIG. 2, an organic light emitting display includes pixels 140 coupled to scan lines S1 to Sn, emission control lines E1 to En, and data lines D1 to Dm, a scan driver 110 for driving the scan lines S1 to Sn and the emission control lines E1 to En, a data driver 120 for driving the data lines D1 to Dm, a power source unit 160 for driving power source lines VL1 to VLn, and a timing controller 150 for controlling the scan driver 110, the data driver 120, and the power source unit 160.

The scan driver 110 receives a scan driving control signal SCS from the timing controller 150. The scan driver 110 then generates scan signals and sequentially supplies the generated scan signals to the scan lines 51 to Sn. In addition, the scan driver 110 generates emission control signals and sequentially supplies the generated emission control signals to the emission control lines E1 to En. In one embodiment, the emission control signal supplied to the ith (i is a natural number) emission control line Ei is supplied at least partially to coincide with the scan signals supplied to the (i−1)th scan line Si−1 and the ith scan line Si.

The power source unit 160 supplies the voltage of the first power source having a first voltage or a second voltage to the power source lines VL1 to VLn. The power source unit 160 supplies the first power source having the first voltage to the ith power source line VLi at least partially to coincide with the scan signal supplied to the (i−1)th scan line Si−1 and supplies the first power source having the second voltage to the other power source lines VL1 to VLi−1 and VLi+1 to Vn. Here, the power source lines VL1 to VLn are formed to run parallel with the scan lines S1 to Sn so that the first power source can be supplied in units of horizontal lines.

According to some embodiments of the present invention, the voltage of the first power source can vary with the structure of the pixels 140. For example, the first power source having the second voltage without a change in a voltage can be supplied to the power source lines VL1 to VLn.

The data driver 120 receives a data driving control signal DCS from the timing controller 150. The data driver 120 then supplies data signals to the data lines D1 to Dm in synchronization with the scan signals.

The timing controller 150 generates the data driving control signal DCS and the scan driving control signal SCS in accordance with synchronizing signals supplied from the outside. The data driving control signal DCS generated by the timing controller 150 is supplied to the data driver 120 and the scan driving control signal SCS is supplied to the scan driver 110. The timing controller 150 controls the power source unit 160 in accordance with the synchronizing signals. In addition, the timing controller 150 supplies the data Data supplied from the outside to the data driver 120.

A display region 130 includes the plurality of pixels 140 arranged in a matrix. Each of the pixels 140 supplies the current corresponding to the data signal from the first power source to the second power source ELVSS through the OLED (not shown) to generate the light (e.g., a predetermined amount of light). The pixel 140 includes a plurality of NMOS transistors and supplies current obtained by compensating for the threshold voltage of the driving transistor to the OLED.

Figure 3:
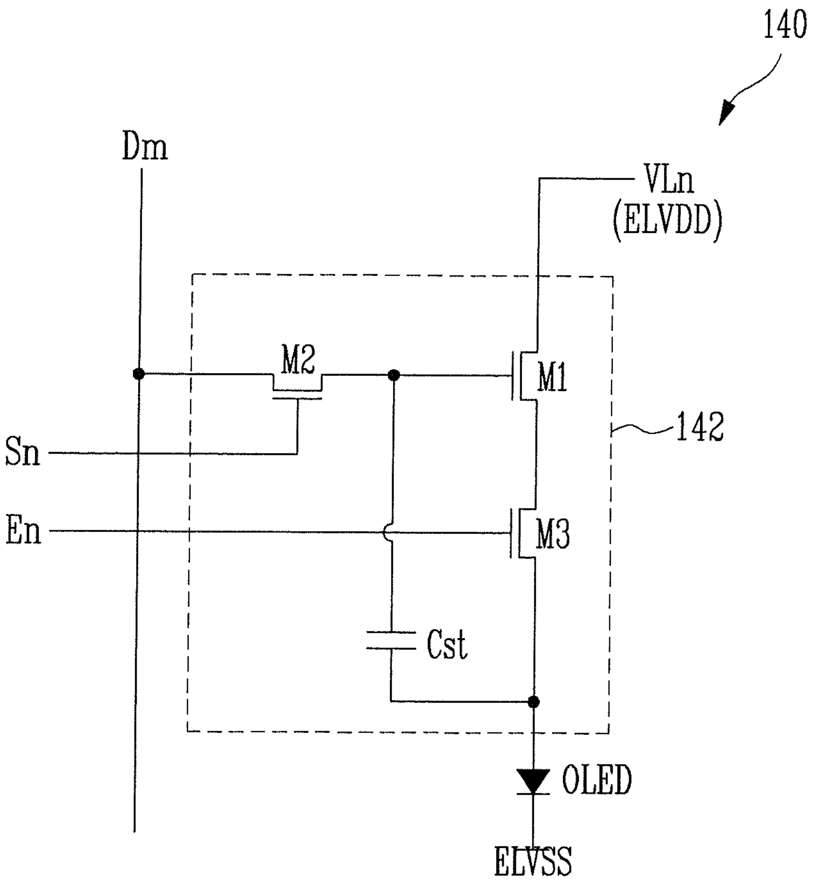
FIG. 3 illustrates one embodiment of the pixel of FIG. 2.

FIG. 3 illustrates a pixel according to one embodiment of the present invention. In FIG. 3, for the sake of convenience, the pixel coupled to the nth scan line Sn and the mth data line Dm is illustrated.

Referring to FIG. 3, the pixel 140 according to one embodiment of the present invention includes an OLED and a pixel circuit 142 coupled to the data line Dm, the emission control line En, and the scan line Sn to control the OLED.

The anode electrode of the OLED is coupled to the pixel circuit 142 and the cathode electrode of the OLED is coupled to a second power source ELVSS. The OLED generates light having a brightness (e.g., a predetermined brightness) that corresponds to the current supplied from the pixel circuit 142.

The pixel circuit 142 charges a voltage corresponding to a data signal and the threshold voltage of a first transistor M1 (that is, a driving transistor) in a storage capacitor Cst and supplies the current corresponding to the charged voltage to the OLED. Therefore, the pixel circuit 142 includes first to third transistors M1 to M3 and the storage capacitor Cst.

The gate electrode of the second transistor M2 is coupled to the scan line Sn and the first electrode of the second transistor M2 is coupled to the data line Dm. The second electrode of the second transistor M2 is coupled to the gate electrode of the first transistor M1. The second transistor M2 is turned on when a scan signal is supplied to the scan line Sn to supply the data signal from the data line Dm to the gate electrode of the first transistor M1.

The gate electrode of the first transistor M1 is coupled to the second electrode of the second transistor M2 and the first electrode of the first transistor M1 is coupled to the power source line VLn. The second electrode of the first transistor M1 is coupled to the first electrode of the third transistor M3. The first transistor M1 controls the amount of current supplied from the power source line VLn to the OLED to correspond to the voltage applied to the gate electrode thereof.

The gate electrode of the third transistor M3 is coupled to the emission control line En and the first electrode of the third transistor M3 is coupled to the second electrode of the first transistor M1. The second electrode of the third transistor M3 is coupled to the anode electrode of the OLED. The third transistor M3 is driven in accordance with the emission control signal supplied through the emission control line En.

The first terminal of the storage capacitor Cst is coupled to the gate electrode of the first transistor M1 and the second terminal of the storage capacitor Cst is coupled to the anode electrode of the OLED. The storage capacitor Cst charges the voltage corresponding to the data signal and the threshold voltage of the first transistor M1.

Figure 4:
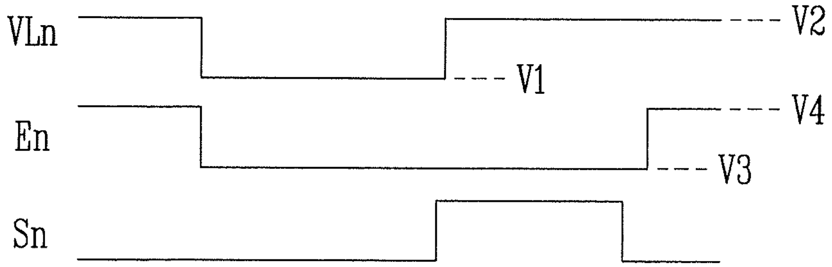
FIG. 4 illustrates waveforms describing a method of driving the pixel of FIG. 3.

FIG. 4 illustrates waveforms for driving the pixel of FIG. 3.

Describing a process of operating the pixel 140 in detail with reference to FIGS. 3 and 4, first, a first power source ELVDD set as a first voltage V1 is supplied to the power source line VLn. Concurrently (e.g., simultaneously) to the first voltage V1 being supplied to the power source line VLn, an emission control signal is supplied to the emission control line En. Here, the emission control signal is set as a third voltage V3 and the value of the third voltage V3 is set so that the third transistor M3 is in a weak turn-on state. For example, the weak turn-on state may be a state where the gate-source voltage of the third transistor M3 is less than the threshold voltage of the third transistor M3.

Here, the anode electrode of the OLED is initialized by the first power source ELVDD having the first voltage V1 supplied to the power source line VLn. Here, the value of the first voltage V1 is set so that the OLED is turned off.

After the OLED is turned off, the first power source ELVDD having the second voltage V2 higher than the first voltage V1 is supplied to the power source line VLn and a scan signal (having a high voltage) is supplied to the scan line Sn. When the second voltage V2 is supplied to the power source line VLn, the voltage of the second electrode of the third transistor M3 increases to the voltage V3−Vth(M3) obtained by subtracting the threshold voltage of the third transistor M3 from the third voltage V3. After the voltage of the second electrode of the third transistor M3 increases to the voltage obtained by subtracting the threshold voltage of the third transistor M3 from the third voltage V3 (i.e., V3−Vth(M3)), the third transistor M3 is turned off.

Meanwhile, the second voltage V2 for supplying current to the OLED is a suitably high voltage to drive a suitable current. For example, in one embodiment, the second voltage V2 is a higher voltage than a fourth voltage V4 supplied to the emission control line, as described below.

When the scan signal is supplied to the scan line Sn, the second transistor M2 is turned on. When the second transistor M2 is turned on, the data signal from the data line Dm is supplied to the gate electrode of the first transistor M1.

In this case, Vgs of the first transistor M1 can be represented by EQUATION 1.

$$Vgs = V\text{data} - V3 + Vth(M3) \qquad \text{[EQUATION 1]}$$

Here, Vdata denotes the voltage of the data signal.

After the voltage corresponding to EQUATION 1 is charged in the storage capacitor Cst, the supply of the scan signal is suspended. When the supply of the scan signal is suspended, the second transistor M2 is turned off.

Then, the supply of the emission control signal (e.g., the pulse having the third voltage V3) to the emission control line En is suspended. When the supply of the emission control signal to the emission control line En is suspended, the voltage of the emission control line En increases to the fourth voltage V4, which is higher than the third voltage V3. Here, when its gate is driven at the fourth voltage V4, the third transistor M3 is turned on.

In this case, the first transistor M1 supplies the current corresponding to the voltage charged in the storage capacitor Cst to the OLED via the third transistor M3. The current supplied to the OLED can be represented by EQUATION 2.

$$Ioled = \beta(Vgs - Vth(M1))^2 = \beta(Vdata - \text{V}3 + Vth(M3) - Vth(M1))^2 \approx \beta(Vdata - \text{V}3)^2 \qquad \text{[EQUATION 2]}$$

Here, β denotes a constant and Ioled denotes the current that flows through the OLED, and it is assumed that the threshold voltage of the first transistor M1 is equal to the threshold voltage of the third transistor M3. Actually, the threshold voltages of the first transistor M1 and the third transistor M3 included in the same pixel are about the same.

Referring to EQUATION 2, the current that flows through the OLED is determined substantially regardless of the threshold voltage of the first transistor M1. Therefore, according to one exemplary embodiment of the present invention, an image with a uniform brightness can be displayed. In addition, according to one exemplary embodiment of the present invention, the voltage charged in the storage capacitor Cst is determined substantially regardless of the voltage of the second power source ELVSS. That is, since the voltage charged in the storage capacitor Cst is determined regardless of the voltage drop of the second power source ELVSS, an image having a desired brightness can be displayed.

Figure 5:
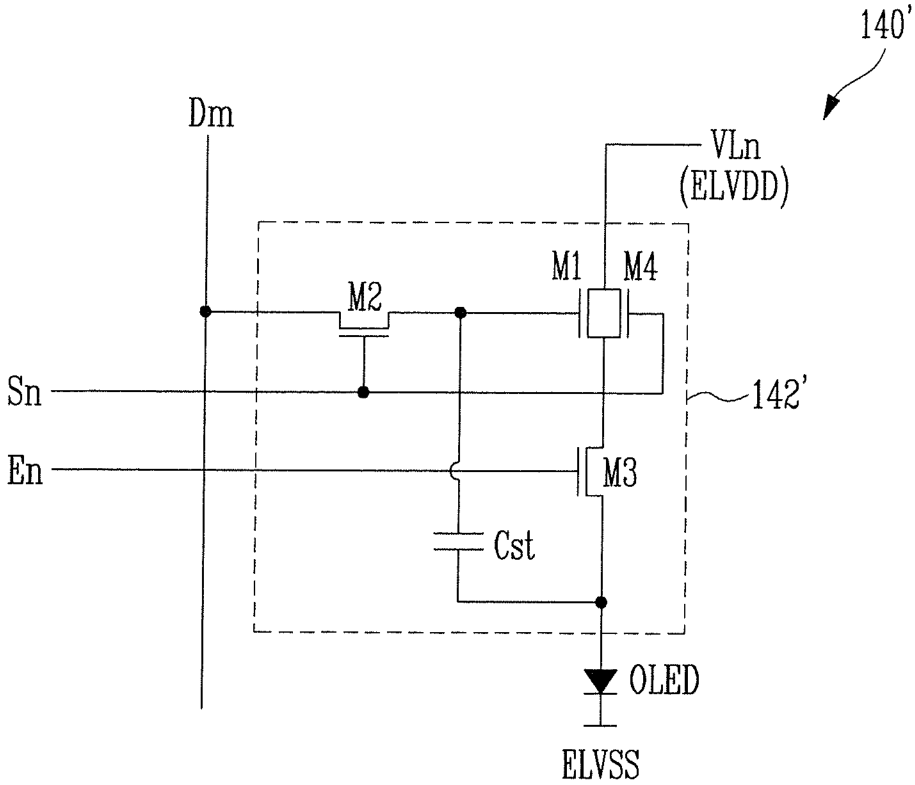
FIG. 5 illustrates another embodiment of the pixel of FIG. 2.

FIG. 5 illustrates a pixel according to a second embodiment of the present invention. In FIG. 5, the same elements as the elements of FIG. 3 are denoted by the same reference numerals and detailed description thereof will be omitted.

Referring to FIG. 5, a pixel 140' according to another embodiment of the present invention further includes a pixel circuit 142' having a fourth transistor M4 coupled between the power source line VLn and the first electrode of the third transistor M3. The fourth transistor M4 is turned on when a scan signal is supplied to the scan line Sn.

To be specific, according to one embodiment of the present invention (illustrated in FIG. 3), when the voltage of the power source line VLn rises to the second voltage V2 after the voltage of the anode electrode of the OLED is initialized, the point in time at which the third transistor M3 is turned off (that is, the time at which the voltage of the second electrode of the third transistor M3 increases to the voltage obtained by subtracting the threshold voltage of the third transistor M3 from the third voltage V3) is determined by the amount of current supplied from the first transistor M1. Here, when the voltage of Vgs of the first transistor M1 is set to be low, it takes long before the third transistor M3 is turned off.

Therefore, according to another embodiment of the present invention (illustrated in FIG. 5), while the scan signal is supplied to the scan line Sn, the fourth transistor M4 is turned on so that the third transistor M3 is turned off within a short time. Since the other operation processes are the same as the operation processes according to one embodiment of the present invention illustrated in FIG. 3, description thereof will be omitted.

Figure 6:
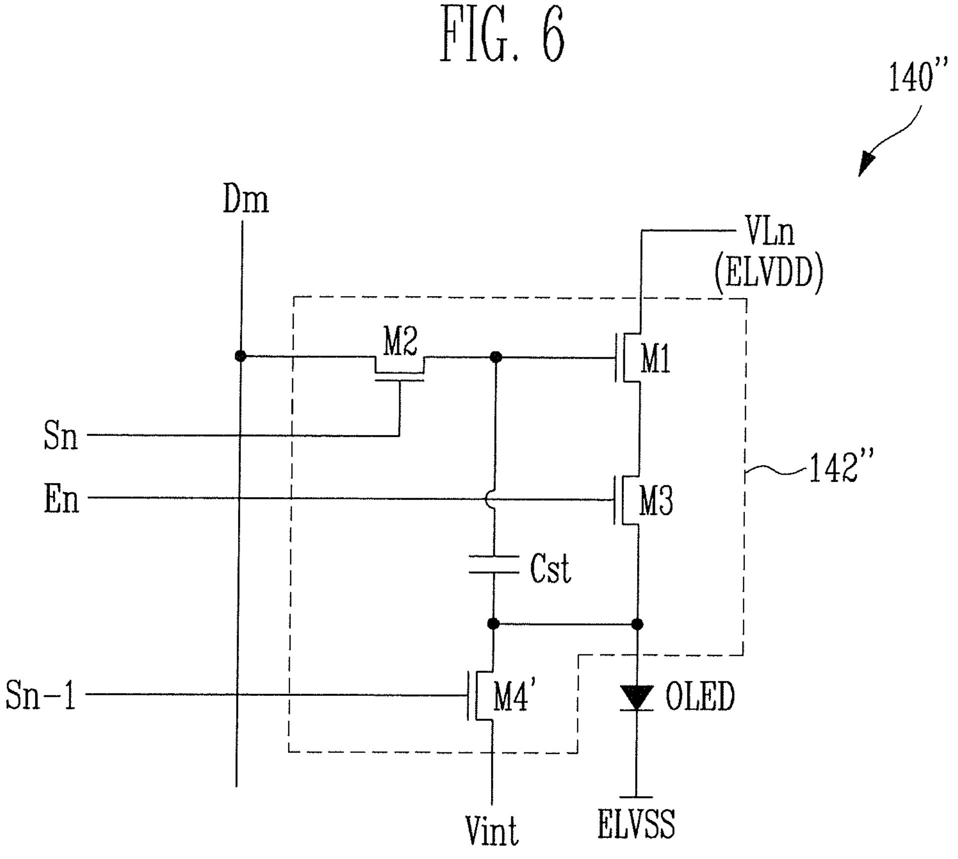
FIG. 6 illustrates a still another embodiment of the pixel of FIG. 2.

FIG. 6 illustrates a pixel according to yet another embodiment of the present invention. In FIG. 6, the same elements as the elements of FIG. 3 are denoted by the same reference numerals and detailed description thereof will be omitted.

Referring to FIG. 6, a pixel 140" according to yet another embodiment of the present invention further includes a pixel circuit 142" having a fourth transistor M4' coupled between the anode electrode of the OLED and an initialization power source Vint. The fourth transistor M4' is turned on when a scan signal is supplied to the (n−1)th scan line Sn−1.

That is, according to the third embodiment of the present invention, the fourth transistor M4' is turned on when the scan signal is supplied to the (n−1)th scan line Sn-1 to initialize the voltage of the anode electrode of the OLED to the voltage of the initialization power source Vint. In some embodiments, the initialization power source Vint has the same voltage as the voltage of the first power source V1 described according to the first embodiment of the present invention.

According to this embodiment of the present invention, since the OLED is initialized using the initialization power source Vint, the first power source ELVDD supplied to the power source line VLn maintains the second voltage V2. In this case, all of the pixels 140" can be commonly coupled to the first power source ELVDD. Since the other operation processes are the same as the operation processes according to the first embodiment of the present invention illustrated in FIG. 3, description thereof will be omitted.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display, comprising:

a scan driver for sequentially supplying a scan signal to a plurality of scan lines and sequentially supplying an emission control signal to a plurality of emission control lines;

a data driver for supplying a data signal to a plurality of data lines in synchronization with the scan signal;

a power source unit for supplying a first power source to a plurality of power source lines; and a plurality of pixels at respective crossing regions of the scan lines, the emission control lines, and the data lines, wherein each of the pixels at an ith (i is a natural number) horizontal line of a plurality of horizontal lines comprises:

an organic light emitting diode (OLED);

a first transistor coupled between a corresponding power source line of the power source lines and the OLED to control an amount of current supplied to the OLED;

a second transistor having a gate electrode coupled to an ith scan line of the scan lines to be turned on when the scan signal is supplied to the ith scan line to supply the data signal to the gate electrode of the first transistor;

a third transistor coupled between the OLED and the first transistor and having a gate electrode coupled to an ith emission control line of the emission control lines; and a storage capacitor having a first electrode directly coupled to the gate electrode of the first transistor and a second electrode directly coupled to an anode electrode of the OLED, wherein the second electrode of the storage capacitor is further coupled to the first transistor through the third transistor.

2. The organic light emitting display as claimed in claim 1, wherein the plurality of pixels comprises NMOS transistors.

3. The organic light emitting display as claimed in claim 1, wherein the scan driver is configured to supply the emission control signal to the ith emission control line at least partially to coincide with the scan signal supplied to an (i−1)th scan line and the ith scan line.

4. The organic light emitting display as claimed in claim 3, wherein the emission control signal comprises a pulse having a third voltage, so that the third transistor is in a weak turn-on state.

5. The organic light emitting display as claimed in claim 4, wherein when the emission control line has a fourth voltage higher than the third voltage, the third transistor is turned on.

6. The organic light emitting display as claimed in claim 3, wherein the power source lines are substantially parallel with the scan lines on each of the horizontal lines.

7. The organic light emitting display as claimed in claim 6, wherein the power source unit is configured to supply a first power source having a first voltage to an ith power source line of the power source lines at least partially to coincide with the scan signal supplied to the (i−1)th scan line and to supply a first power source having a second voltage higher than the first voltage to remaining power source lines of the power source lines.

8. The organic light emitting display as claimed in claim 7, wherein the first voltage supplied to the first power source line is adapted to turn off the OLED.

9. The organic light emitting display as claimed in claim 3, further comprising a fourth transistor coupled between the corresponding power source line of the power source lines and the third transistor, the fourth transistor adapted to be turned on when the scan signal is supplied to the ith scan line.

10. The organic light emitting display as claimed in claim 3, further comprising a fourth transistor coupled between the anode electrode of the OLED and an initialization power source, the fourth transistor adapted to be turned on when the scan signal is supplied to the (i−1)th scan line.

11. The organic light emitting display as claimed in claim 10, wherein the initialization power source is configured to supply an initialization signal having a voltage adapted to turn off the OLED.

12. The organic light emitting display as claimed in claim 10, wherein the power source unit is configured to supply a predetermined voltage to the power source lines so current can be supplied to the OLED.

* * * * *

UNITED STATES PATENT AND TRADEMARK OFFICE

CERTIFICATE OF CORRECTION

PATENT NO. : 8,610,700 B2
APPLICATION NO. : 12/710219
DATED : December 17, 2013
INVENTOR(S) : Sang-Moo Choi It is certified that error appears in the above-identified patent and that said Letters Patent is hereby corrected as shown below:

On the Title Page

| | |
|---|---|
| (56) References Cited, | Delete "10-009-0017541," |
| Other Publications, line 2 | Insert -- 10-2009-0017541, -- |

Signed and Sealed this
Eighth Day of September, 2015

Michelle K. Lee
*Director of the United States Patent and Trademark Office*